United States Patent [19]

Calmettes et al.

[11] Patent Number: 5,273,323
[45] Date of Patent: Dec. 28, 1993

[54] CONNECTION ELEMENT FOR THE RAPID CONNECTION OF A TUBE TO A HOSE

[75] Inventors: Lionel Calmettes, Romorantin; Pascal Detable, Villedieu, both of France

[73] Assignee: Etablissements Caillau, Issy-les-Moulineaux

[21] Appl. No.: 871,650

[22] Filed: Apr. 21, 1992

[30] Foreign Application Priority Data

Apr. 29, 1991 [FR] France .................. 91 05267

[51] Int. Cl.⁵ ................. F16L 33/20; F16L 37/00
[52] U.S. Cl. ................... 285/321; 285/305; 285/256
[58] Field of Search ........... 285/321, 305, 238, 239, 285/256

[56] References Cited

U.S. PATENT DOCUMENTS

| | | | |
|---|---|---|---|
| 3,453,005 | 7/1969 | Foults . | |
| 4,640,534 | 2/1987 | Hoskins et al. . | |
| 4,707,000 | 11/1987 | Torgardh | 285/305 |
| 4,969,669 | 11/1990 | Saver | 285/256 |
| 5,040,829 | 8/1991 | Saver | 285/256 |
| 5,054,952 | 10/1991 | Chara . | |

FOREIGN PATENT DOCUMENTS 2948560 6/1981 Fed. Rep. of Germany .
91/11649 8/1992 PCT Int'l Appl. .

Primary Examiner—Eric K. Nicholson
Attorney, Agent, or Firm—Marshall & Melhorn

[57] ABSTRACT

This invention relates to an element for rapid connection between a supple hose pipe, for example, made of rubber, and a tube made of rigid material, such as metal, or semi-rigid material, such as a plastic material. It is constituted by an assembly of an inner and outer bush tightened around the hose pipe. A housing for an O-ring is partially formed on the inner surface of the inner bush. The housing is closed by an annular radial wall distinct from the inner bush. A tube is immobilized in the element by a split ring which provides a stop for a shoulder located at the end of an annular ramp provided on the tube. The split ring is located in a annular housing formed partly by the radial portion of a distinct bush.

4 Claims, 5 Drawing Sheets

CONNECTION ELEMENT FOR THE RAPID CONNECTION OF A TUBE TO A HOSE

FIELD OF THE INVENTION

The present invention relates to a connection element for rapidly connecting a tube.

BACKGROUND OF THE INVENTION

A rapid connection element between a supple hose-pipe, for example made of rubber, and a tube of rigid material such as metal, or semi-rigid, such as a plastics material, is already disclosed in Pat. No. EP-A-440.564. Such a connection element is constituted by an assembly of two, internal and external bushes, tightening on the hosepipe, whilst a housing for an O-ring is provided on the inner surface of the inner bush. The housing for the O-ring is closed, outwardly in the axial direction, by an annular radial wall distinct from the inner bush and fixed thereto.

The structure of such a connection element renders manufacture thereof particularly economical, since it may be made from suitably stamped, thin metal sheets, the fixation of the different members generally being effected by simple crimpings.

In particular, the European Patent mentioned above indicates that the annular radial wall closing the housing of the O-ring may receive various appendices comprising locking means intended to cooperate with complementary means provided on the tube to ensure, after it has been introduced in the connection element, their axial immobilization. With respect to the O-ring, the locking means are located beyond (towards the outside) the added radial wall closing the housing for the O-ring.

When the tube to be fitted in the connection element presents a small diameter, it is often advantageous to shape the zone to be fitted so that it comprises, successively, from the end of the tube, on the one hand, a cylindrical portion intended to come into contact with the O-ring of the connection element, on the other hand, an annular ramp terminating in a radial shoulder capable of constituting a stop cooperating with the locking means provided on the connection element.

Published application no. DE-A-2 948 560 or U.S. Pat. No. 4,460,534 in particular, disclose a rapid connection element in which the locking means provided on said element comprise a split ring, elastically deformable in the radial sense. Such a ring is disposed in an annular housing of which the inner and outer radial faces constitute axial stops for said ring, thus limiting its possibilities of axial displacement. After introduction of the tube in the connection element, the split ring constitutes a stop for the shoulder of the tube and thus ensures axial immobilization thereof.

However, the embodiments proposed by the two documents mentioned above are not directly applicable to the technique of manufacturing the connection element described by Pat. No. EP-A-440.564. In fact, they require a solid piece in which the annular housing for the split ring is formed by machining.

It is therefore an object of the invention to provide a connection element capable of being manufactured in accordance with the advantageous technique set forth in Pat. No. EP-A-440.564 whilst allowing the fit of a tube capable of being axially immobilized by complementary means of the type such as those described by documents DE-A-2 948 560 or U.S. Pat. No. 4,460,534.

SUMMARY OF THE INVENTION

According to the invention, the inner radial face of the annular housing for the split ring is constituted by a radial portion of an annular bush distinct from the connection element and added therein, said bush presenting a truncated portion complementary of that formed by the annular ramp of the tube.

Thanks to these arrangements, manufacture of a connection element requires only simple, inexpensive operations, whilst leading to light products.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
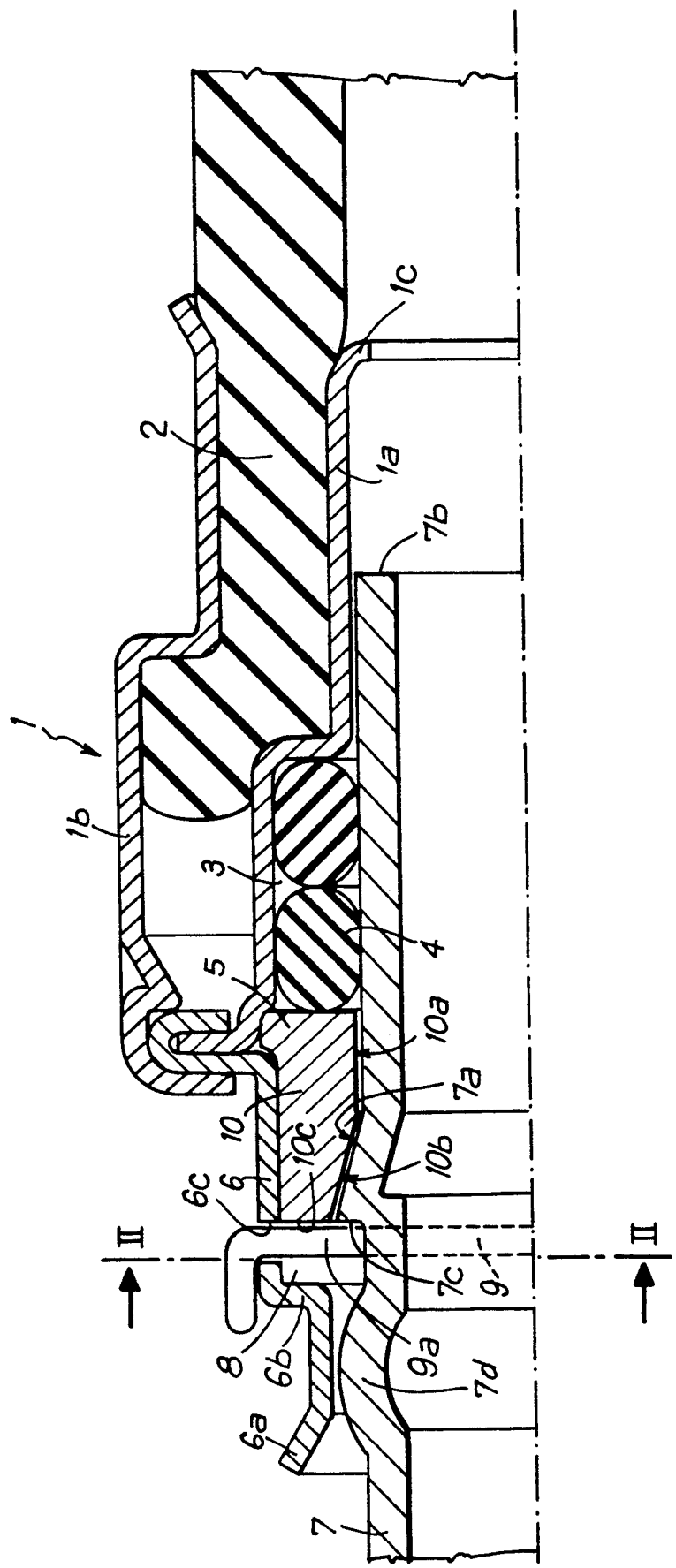
FIG. 1 is a view in axial section of a connection element according to the invention, after connection of the tube which it is intended to receive.
Figure 2:
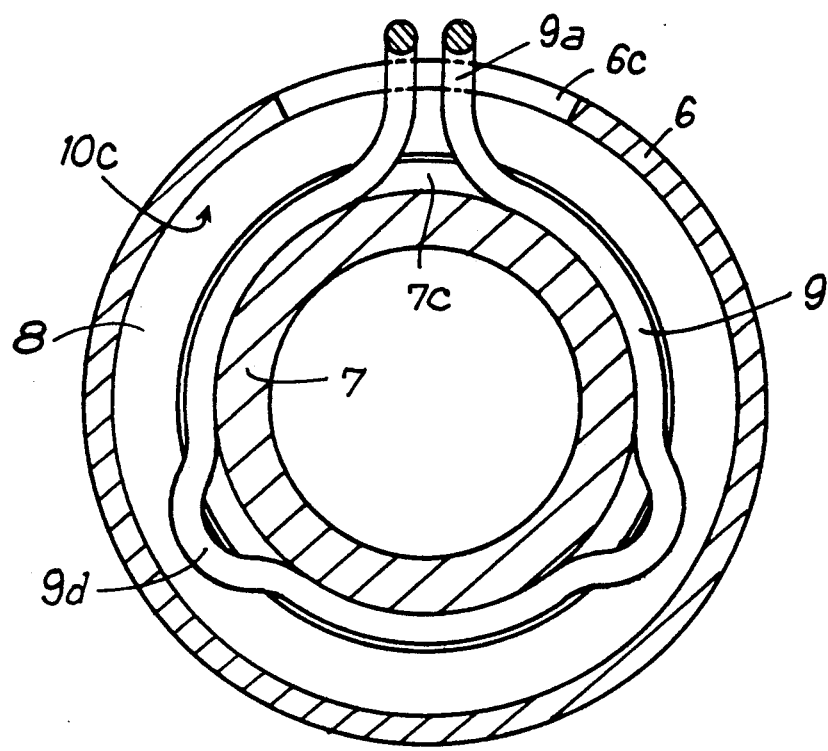
FIG. 2 is a section along II—II of FIG. 1.

Referring now to the drawings and firstly to FIGS. 1 and 2, a connection element is shown, generally designated by reference 1, mounted at the end of the supple hosepipe 2 in accordance with the technique described in document EP-A-440 564.

In the embodiment shown, the inner bush 1a of the connection element receives, in an annular housing 3, at least one O-ring 4. An annular radial wall 5 is fixed both to the inner bush 1a and to the outer bush 1b and to the sleeve 6 by means of suitable crimpings which have been described in the document mentioned above.

The connection element is intended, under conditions which will be specified, to allow the rapid connection of a tube 7, itself capable of being made of various materials, for example of a rigid material such as metal, or semi-rigid such as a plastics material.

The connection element 1 obviously comprises, from its inlet end 6a for the tube 7, a bore whose diameter is substantially equal to the outer diameter of the tube 7, at least over a notable portion of its length. As shown in FIG. 1, the bore extends from the inlet end 6a to the inner bush 1a.

From the inlet end 6a are successively located an annular housing 8 in which a split ring 9 is axially immobilized, on the other hand a bush 10 whose axial end most remote from the inlet 6a constitutes the radial wall 5 mentioned above. These elements constitute the means for axially immobilizing the tube 7 and they will now be described in detail.

In the example shown, the bush 10 is constituted by a solid piece, added on the inner bush 1a of the connection element. It presents a cylindrical portion 10a whose inner diameter is substantially equal to the diameter of the tube 7. However, towards the inlet orifice 6a, the bush 10 constitutes a widening truncated portion 10b whose end 10c constitutes the inner radial face of the annular housing 8. The latter is limited, on the other hand, by the cylindrical sleeve 6 whose shoulder 6b constitutes the outer radial face of the housing 8.

Between the two radial faces 10c and 6b of housing 8 is located the split ring 9 which, as shown in FIG. 1, may be constituted by a "spring steel" wire ring. In the free state, the diameter of the ring 9 is at the most equal to and preferably slightly smaller than the diameter of the tube 7. The two edges of the split provided in the ring are each provided with a radial lug 9a projecting outside the housing 8, passing through an opening 6c made in the wall of the sleeve 6. On the other hand, as clearly shown in FIG. 2, the ring 9 comprises two ribs 9d projecting radially outside the ring. Whilst allowing the ring the possibility of expanding radially in its housing 8, these ribs facilitate centering for reasons which will appear hereinafter.

Figure 3:
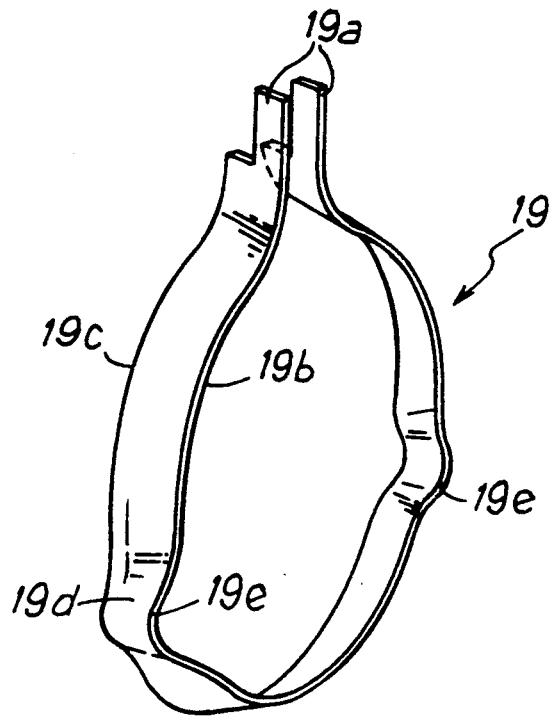
FIG. 3 is a view in perspective of an advantageous variant embodiment of the split ring capable of being mounted on the connection element of FIG. 1.

An advantageous variant of the split ring 9 will be described hereinbelow with reference to FIG. 3.

Tube 7 presents, in known manner, an annular ramp 7a located at an appropriate distance from its end 7b, in practice substantially less than the length of the bore of the connection element between its inlet 6a and the end 1c of the inner bush 1a. On the side opposite end 7b, the ramp 7a constitutes a radial shoulder 7c on the outer wall of the tube.

The ramp 7a, which forms a truncated portion of the tube, may be obtained, as shown, by a suitable deformation of the wall of the tube 7 at the moment of manufacture thereof or, on the contrary, may be constituted by an added element fixed to the tube, for example by gluing or any other like means.

As shown in FIG. 1, the tube 7 comprises a slight swell 7d located beyond the ramp 7a, this swell preferably being provided in the case of tube 7 presenting a relatively small diameter. The maximum diameter of the swell 7b is substantially equal to the maximum diameter of the ramp 7a.

Connection of tube 7 in the connection element is effected in the following manner. It suffices to fit the end 7b of the tube and the cylindrical part which follows it in the inlet 6a of the connection element. The tube penetrates firstly in the portion of bore constituted by the sleeve 6, then traverses the split ring 9, provoking, if necessary, a slight radial extension thereof. The tube then crushes the or each O-ring 4 and finally reaches the terminal zone of the inner bush 1a. As has already been indicated, the length of the cylindrical part of the tube following its end 7b does not need to be defined precisely provided that this end does not risk passing beyond nor even reaching the end 1c of the inner bush 1a.

In fact, in the final phase of fit of the tube 7, the ramp 7a reaches the ring 9 and provokes radial expansion thereof in the housing 8. When the shoulder 7c has itself passed beyond the ring 9, the latter retracts elastically to constitute an axial stop for the shoulder 7c. The ring 9 being immobilized between the radial faces 6b and 10c of the housing 8, the tube 7 is itself axially fixed in the connection element 1. The truncated portion 10b of the bush 10 makes it possible, after axial locking of the tube, to receive the ramp 7a and possibly constitutes an axial stop for the tube, in the sense of fit.

Finally, it will be emphasized that, when it exists, the swell 7d of the tube 7 improves, if necessary, the centering of the tube in the connection element and consequently the resistance of the connection with respect to the vibrations to which the tube 7 may be subjected.

If it is desired to dismantle the connection and to extract the tube 7 from its connection element, it suffices to move apart the radial lugs 9a of the ring 9, with the aid of a tool such as a screwdriver, to provoke radial expansion of said ring. As soon as the inner diameter of the ring is greater than that of the shoulder 7c, the tube may easily be extracted from the connection element.

If reference is now made to FIG. 3, a variant is shown of the split ring described hereinabove. It may advantageously replace the latter, virtually without any modification of the structure and dimensions of the housing 8. The elements already described will bear the same references increased by 10.

In this variant, the ring 19 is constituted by a thin sheet, of truncated shape, preferably corresponding to that of the ramp 7a of the tube. The diameter of the small base 19b is, when the ring is in the free state, at the most equal to and preferably slightly smaller than that of the tube 7. On the other hand, under the same conditions, the diameter of the large base 19c is at least equal to the diameter of the tube 7 and this large base is located, in the housing 8, towards the inlet 6a of the connection element.

In order to facilitate centering of the ring in the housing 8, one or more longitudinal ribs 19d, stamped in the truncated wall of the ring, are provided. These ribs, of substantially cylindrical shape, project radially from the outer wall of the ring, in outstanding manner towards the small base 19b.

The axial length of the ring 19 preferably corresponds to that of the housing 8 so that only the notched ends of the radial lugs 19a pass through the opening 6c and project outside the sleeve 6.

Positioning and dismantling of the tube 7 are effected in the manner described hereinabove, locking of the tube being ensured by the abutment of the shoulder 7c of the tube on the small base 19b of the ring 19. To that end, it will be advantageous if the longitudinal edge 19e of the ribs 19d are slightly recessed with respect to the plane of the small base 19b of the ring.

Figure 4:
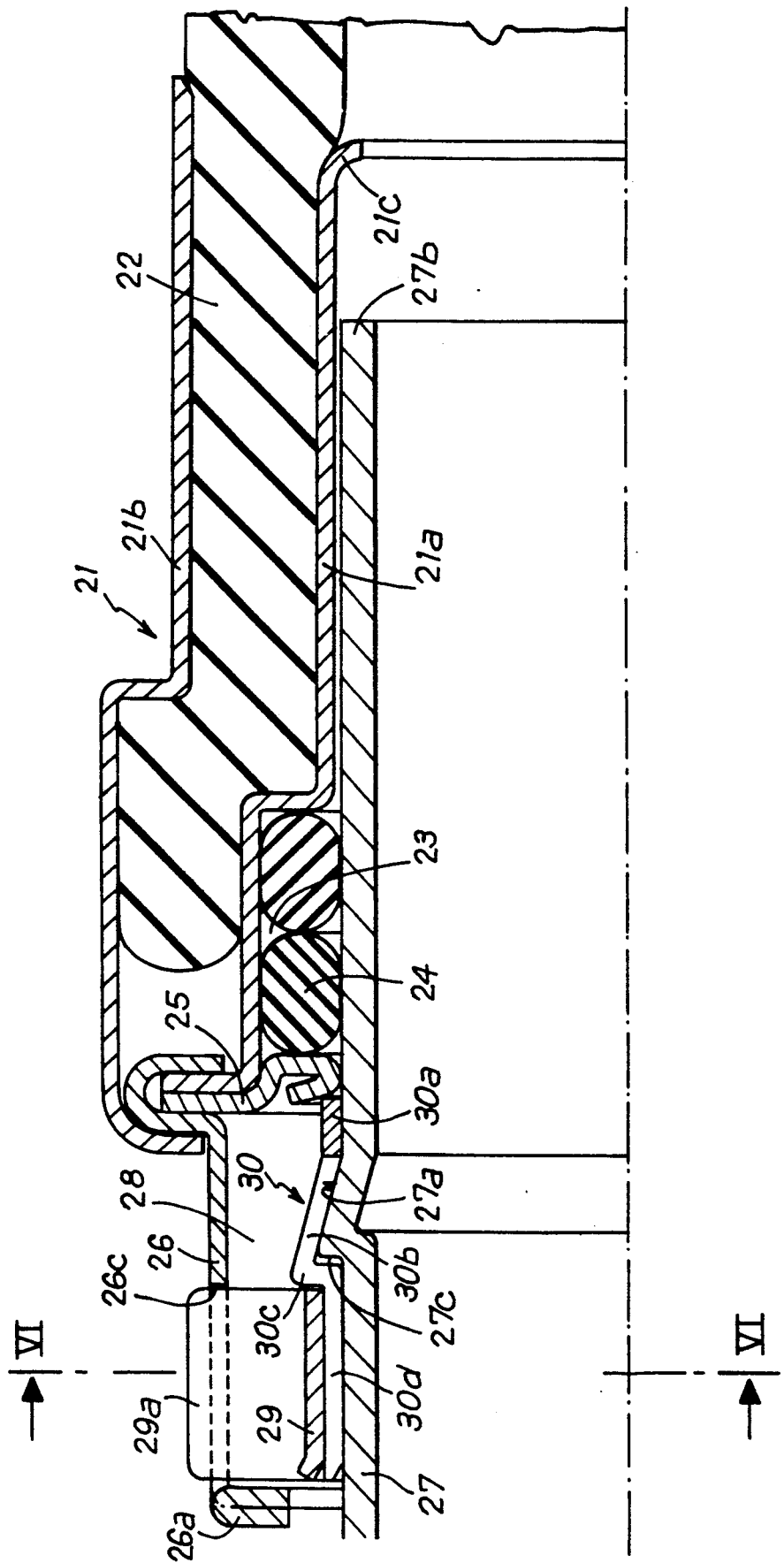
FIG. 4 is a view in section of a variant embodiment of the connection element shown in FIG. 1.
Figure 5:
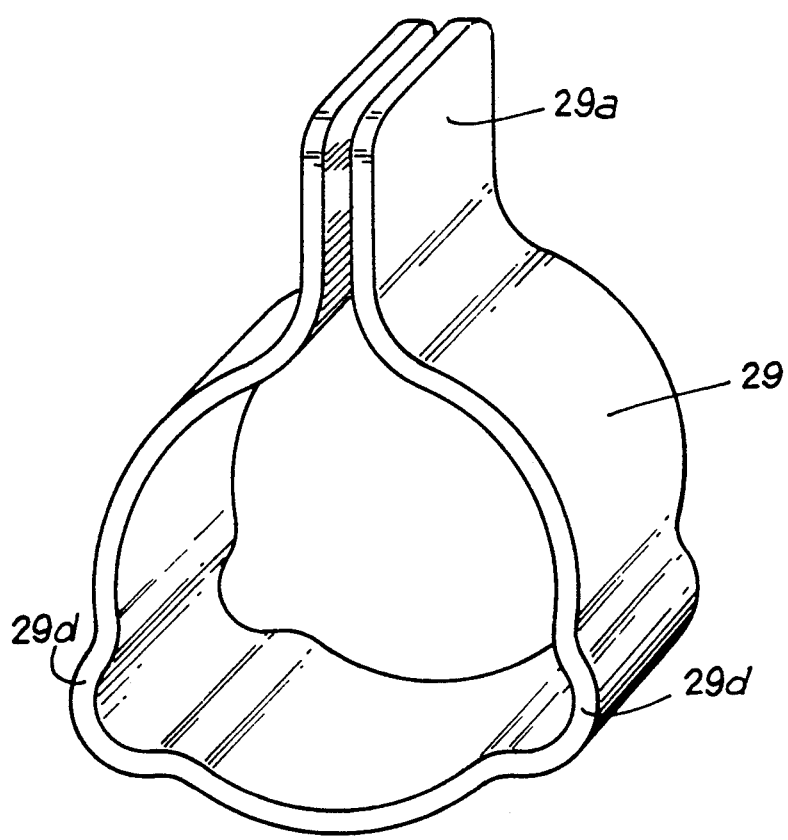
FIG. 5 is a view in perspective of the split ring used on the connection element according to FIG. 4.
Figure 6:
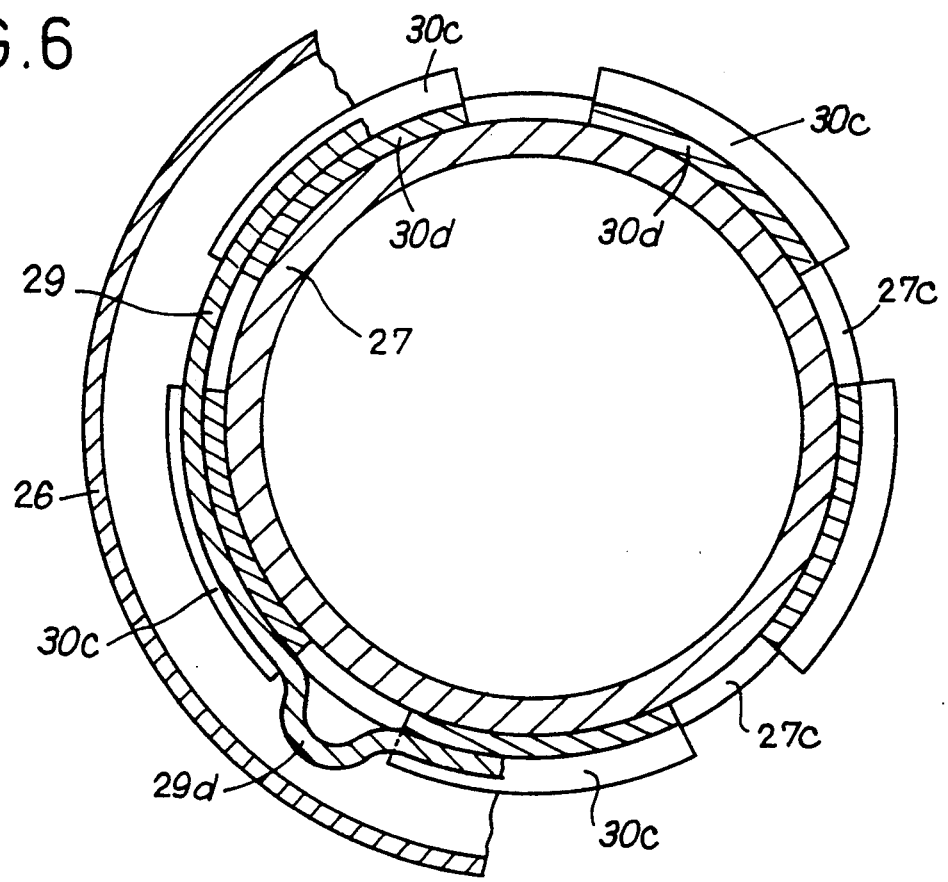
FIG. 6 is a section along VI—VI of FIG. 4.

Finally, referring to FIGS. 4 to 6, a variant of the connection element according to the invention is shown therein. The elements already described with reference to FIGS. 1 and 2 bear the same references increased by 20.

The connection element 21 comprises inner and outer bushes 21a and 21b respectively, assembled by crimping, on the one hand, on the radial wall 25 closing the housing 23 for the O-rings 24, on the other hand, on the cylindrical sleeve 26 of which the end 26a constitutes the inlet of the bore of the connection element.

The bush 30 is, here, independent of the wall 25. In fact, it is reduced to a thin sleeve, comprising a cylindrical portion 30a and a truncated portion 30b. The latter is extended, beyond its end 30c, by a plurality of radially flexible lugs 30d.

The split ring 29 is itself disposed around the lugs 30d that it grips and, as shown in FIGS. 5 and 6, comprises longitudinal ribs 29d intended to facilitate centering thereof in the housing 28 as has already been indicated hereinabove.

In the case of the embodiment shown in FIGS. 5 and 6, the lugs 30d extend longitudinally up to the vicinity of the inlet 26a of the connection element. The slots made between two contiguous lugs preferably extend, towards the interior of the connection piece, at least over a part of the truncated portion 30b, possibly up to the vicinity of the cylindrical portion 30a of the bush 30.

Figure 7:
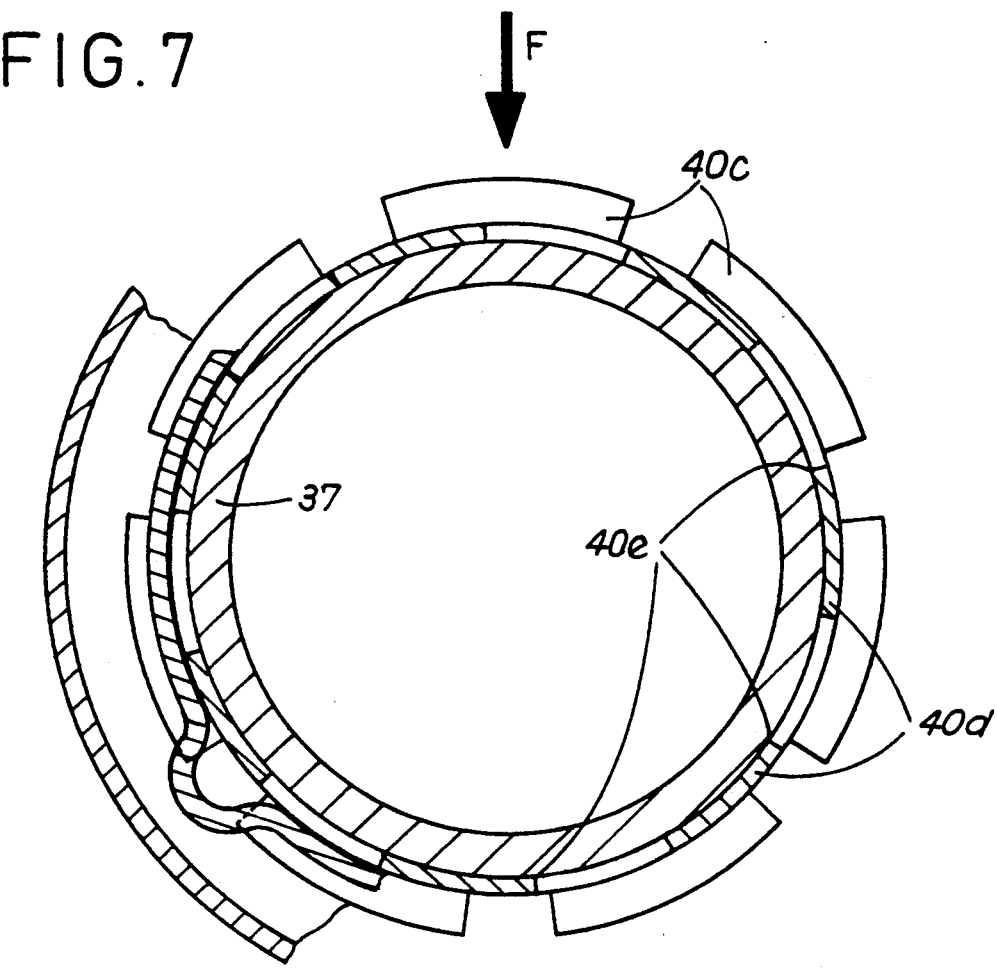
FIG. 7 is a view similar to FIG. 6 in the case of a variant embodiment of the bush.
Figure 8:
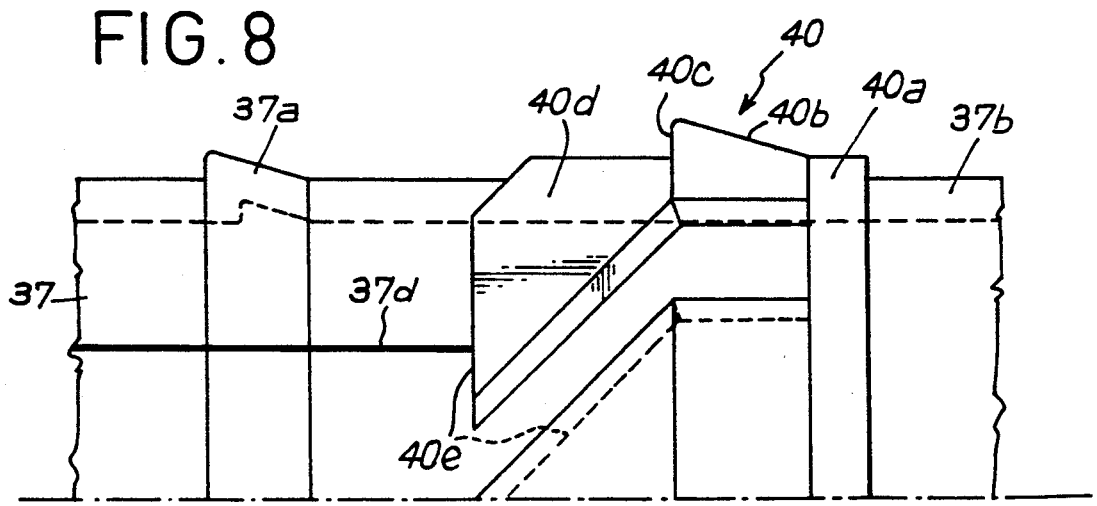
FIG. 8 is a partial view in the direction of arrow F of FIG. 7.

In the case of the variant embodiment shown in FIGS. 7 and 8 (the elements of FIGS. 4 to 6 already described bear the same references increased by 10), the lugs 40d are substantially helicoidal as well as the slots which separate two contiguous lugs. There again, it will be preferable if these slots extend over at least a part of the truncated portion 40a of the bush 40.

The tube 27 is placed in position in a manner similar to what has been described hereinabove.

The end 27b of the tube and the cylindrical part which follows it penetrate in the bore constituted by the lugs 30d, the cylindrical portion 30a of the bush 30 and the terminal zone of the inner bush 21a.

After the ramp 27a of the tube has reached the inlet 26a, it moves the lugs 30d radially apart against the tightening effort exerted thereon by the split ring 29. When the shoulder 27c of the tube has exceeded the end 30c of the truncated portion 30b of the bush, the lugs 30d return into contact with the tube and the ring 29 tightens again, thus constituting the stop for axial immobilization of the tube.

For dismantling, it again suffices to move the lugs 29a of the ring apart with the aid of a tool, so that its diameter increases sufficiently to allow not only the shoulder 27c and the ramp 27a to pass, but also the bush 30 which is driven thereby, at the moment of extraction of the tube.

The connection element may nonetheless be used again. In certain cases, it will be preferred to separate the bush 30 from the tube 27 and to replace the bush inside the connection element in the position shown in FIG. 4. The tube may then be locked again in the connection element.

In other cases, the tube 27, on which the bush 30 will have remained mounted, may be introduced directly in the connection element, the ring 29 in that case allowing, by its radial expansion, the passage of the assembly.

If the independent bush 40 has the structure shown in FIGS. 7 and 8, assembly and dismantling are effected in the manner which has just been indicated. However, a particular advantage of the embodiment of this bush will be underlined.

In fact, the manufacture of the tubes adapted to be fitted in the connection elements of the type in question frequently leaves irregularities on the outer surface of the tube, for example small projecting ribs such as those designated by reference 37d in FIG. 8. Such roughness risks being detrimental to the tightness of the connection, as they "injure" the O-rings, both during fit of the tube and due to the vibratory movements to which the tube may be subjected during service.

Thanks to the presence, on lugs 40d, of the edges 40e coming into contact with the outer surface of the tube (they are left as sharp as possible during manufacture of the bush 40), the possible roughness of the tube in the region located between its end 37b and the ramp 37a is eliminated by deburring in the course of positioning of the tube. In this way, the cylindrical surface which comes into contact with the O-rings is perfectly smooth and tightness of the connection is improved.

What is claimed is:

1. A coupling for connecting a supple hose pipe and a rigid tube comprising:
   (a) an annular ramp adapted to surround the tube a predetermined axial distance from the end thereof including:
      (i) a widening truncated portion, and
      (ii) a radial shoulder portion; and
   (b) a connection element for receiving said ramp including:
      (i) an outer bush adapted to engage the outside of the pipe,
      (ii) an inner bush adapted to engage the inside of the pipe including:
         (a) a portion of an annular housing,
      (iii) a bush connected to the inner bush including:
         (a) an inner radial wall closing the annular housing of the inner bush,
         (b) a widening truncated portion complementary in shape to the widening truncated portion of said ramp to receive the same, and
         (c) an end radial wall,
      (iv) a sleeve affixed between the outer bush and the inner bush including an annular housing, and
      (iv) a split ring located in the annular housing of the sleeve for engaging said ramp upon insertion thereof in said connection element in an axial direction, and to retain said ramp after said ramp is inserted past the split ring.

2. A coupling for connecting a supple hose pipe and a rigid tube comprising:
   (a) an annular ramp adapted to surround the tube a predetermined axial distance from the end thereof including:
      (i) a widening truncated portion, and
      (ii) a radial shoulder portion; and
   (b) a connection element for receiving said ramp including:
      (i) an outer bush engaging the outside of the pipe,
      (ii) an inner bush engaging the inside of the pipe including:
         (a) a portion of an annular housing,
      (iii) a radial wall affixed between the inner bush and the outer bush and closing the annular housing of the inner bush,
      (iv) a bush including:
         (a) a cylindrical portion proximate the annular radial wall,
         (b) a plurality of radial lugs extending from the cylindrical portion of the bush, each of the radial lugs including a widening truncated portion complementary in shape to the widening truncated portion of said ramp, an end portion to act as a stop for said ramp, and a straight portion, and
      (v) a split ring located in the annular housing of the sleeve and disposed around the radial lugs of the bush.

3. The coupling defined in claim 2, wherein the straight portion of each of the radial lugs are inclined with respect to the axis of the coupling.

4. The coupling defined in claim 3, wherein at least one of the edges of one of the inclined straight portions of the radial lugs has a sharp edge capable of coming into contact with the outer surface of the tube.

* * * * *